United States Patent
Zhu et al.

(10) Patent No.: US 9,143,984 B2
(45) Date of Patent: Sep. 22, 2015

(54) MAPPING OF ENHANCED PHYSICAL DOWNLINK CONTROL CHANNELS IN A WIRELESS COMMUNICATION NETWORK

(71) Applicant: Intel Corporation, Santa Clara, CA (US)

(72) Inventors: Yuan Zhu, Beijing (CN); Xiaogang Chen, Beijing (CN); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 504 days.

(21) Appl. No.: 13/672,560

(22) Filed: Nov. 8, 2012

(65) Prior Publication Data

US 2013/0272214 A1   Oct. 17, 2013

Related U.S. Application Data

(60) Provisional application No. 61/624,185, filed on Apr. 13, 2012.

(51) Int. Cl.
| | |
|---|---|
| *H04W 80/04* | (2009.01) |
| *H04W 88/06* | (2009.01) |
| *H04W 28/04* | (2009.01) |
| *H04W 72/04* | (2009.01) |
| *H04W 28/08* | (2009.01) |
| *H04W 28/02* | (2009.01) |
| *H04L 5/00* | (2006.01) |
| *H04W 74/08* | (2009.01) |
| *H04W 36/08* | (2009.01) |

(Continued)

(52) U.S. Cl.
CPC ............ *H04W 28/08* (2013.01); *H04L 5/0001* (2013.01); *H04W 24/02* (2013.01); *H04W 28/02* (2013.01); *H04W 36/08* (2013.01); *H04W 72/04* (2013.01); *H04W 72/042* (2013.01); *H04W 74/0808* (2013.01); *H04W 76/023* (2013.01); *H04W 24/10* (2013.01); *H04W 36/0016* (2013.01); *H04W 76/028* (2013.01); *Y02B 60/50* (2013.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

2013/0194931 A1* 8/2013 Lee et al. ...................... 370/241

OTHER PUBLICATIONS

International Preliminary Report on Patentability mailed on Oct. 23, 2014 from International Application No. PCT/US2013/035946.

(Continued)

*Primary Examiner* — Ronald B Abelson
(74) *Attorney, Agent, or Firm* — Schwabe, Williamson & Wyatt, P.C.

(57) ABSTRACT

In embodiments, an evolved Node B (eNB) of a wireless communication network may map individual enhanced control channel elements (eCCEs) of a physical resource block (PRB) pair to a plurality of non-continuous enhanced resource element groups (eREGs) of the PRB pair. The eNB may further map the plurality of eREGs to individual antenna ports for transmission to the UE, with individual antenna ports associated with a continuous group of eREGs. The eNB may assign at least a portion of an enhanced physical downlink control channel (ePDCCH) to one or more of the eCCEs for transmission to the UE. Additionally, or alternatively, an eNB may map eCCEs of a plurality of PRB pairs to a plurality of distributed resource block (DRB) pairs.

29 Claims, 7 Drawing Sheets

(51) Int. Cl.
*H04W 24/02* (2009.01)
*H04W 76/02* (2009.01)
*H04W 24/10* (2009.01)
*H04W 36/00* (2009.01)

(56) References Cited

OTHER PUBLICATIONS

Ericsson et al., "Search spaces for ePDCCH", 3GPP TSG-RAN WG1 #68bis, R1-121022, Jeju, Republic of Korea, Mar. 26-30, 2012.
Ericsson et al., "Reference signals for ePDCCH", 3GPP TSG-RAN WG1 #68bis, R1-121021, Jeju, Republic of Korea, Mar. 26-30, 2012.
Fujitsu, "Antenna ports for EPDCCH detection", 3GPP TSG-RAN WG1 #68bis, R1-121191, Jeju, Republic of Korea, Mar. 26-30, 2012.
Nokia et al., "Consideration on search spaces", 3GPP TSG-RAN WG1 #68bis, R1-121287, Jeju, Republic of Korea, Mar. 26-30, 2012.
Nokia et al., "Control channel region for ePDCCH", 3GPP TSG-RAN WG1 #68bis, R1-121289, Jeju, Republic of Korea, Mar. 26-30, 2012.
International Search Report and Written Opinion for International Application No. PCT/US2013/035946, mailed Jul. 26, 2013.

\* cited by examiner

MAPPING OF ENHANCED PHYSICAL DOWNLINK CONTROL CHANNELS IN A WIRELESS COMMUNICATION NETWORK

CROSS REFERENCE TO RELATED APPLICATIONS

The present application claims priority to U.S. Provisional Patent Application No. 61/624,185, filed Apr. 13, 2012, entitled "ADVANCED WIRELESS COMMUNICATION SYSTEMS AND TECHNIQUES," the entire disclosure of which is hereby incorporated by reference.

FIELD

Embodiments of the present invention relate generally to the field of communications, and more particularly, to mapping of enhanced physical downlink control channels in a wireless communication network.

BACKGROUND

In wireless communication networks, an evolved Node B (eNB) transmits a control channel, such as an enhanced physical downlink control channel (ePDCCH) to a user equipment. The ePDCCH includes downlink control information (DCI) with information used by the UE to receive a physical downlink shared channel (PDSCH). In many wireless communication networks, the eNB may use either localized or distributed transmission of the ePDCCH. However, distributed transmission of the ePDCCH may present a different interference fingerprint than localized transmission of the ePDCCH, which may make it difficult for a neighboring cell to cancel the interference.

Additionally, in some wireless communication networks, it is not permitted for the PDSCH to be transmitted in the same physical resource block (PRB) pair as the ePDCCH. This may cause bandwidth wastage due to unused resource elements of the PRB pair that is used to transmit portions or all of the ePDCCH.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, and apparatuses for mapping enhanced physical downlink control channels in a wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
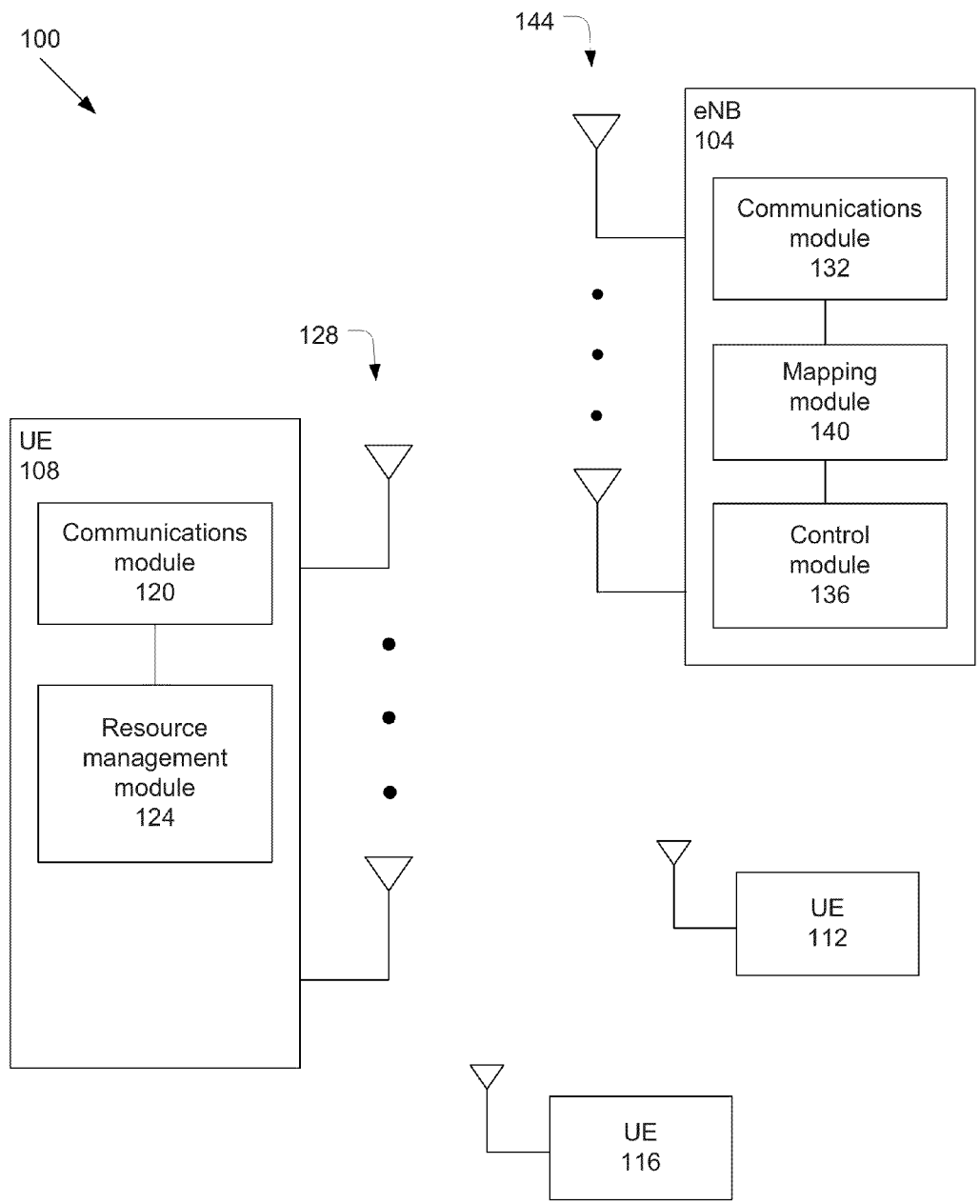
FIG. 1 is a block diagram illustrating wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., evolved Node B (eNB) 104, configured to wirelessly communicate with a user equipment (UE) 108. The network 100 may further include one or more additional UEs, e.g., UEs 112 and 116, that wirelessly communicate with eNB 104.

The UE 108 may include a communications module 120 and a channel resource management module 124 coupled with one another. The communications module 120 may communicate (e.g., transmit and/or receive) with the eNB 104 over the network 100. The resource management module 124 may facilitate mapping of physical resources of the network (e.g., resource elements and/or resource blocks) to physical channels, as further discussed below.

The UE 108 may include any suitable number of antennas 128. In various embodiments, the UE 108 may include at least as many antennas 128 as a number of simultaneous spatial layers or streams received by the UE 108 from the eNB 104, although the scope of the present disclosure may not be limited in this respect. The number of simultaneous spatial layers or streams may also be referred to as transmission rank, or simply rank.

One or more of the antennas 128 may be alternately used as transmit or receive antennas. Alternatively, or additionally, one or more of the antennas 128 may be dedicated receive antennas or dedicated transmit antennas.

Though not shown explicitly, the UEs 112 and 116 may include modules/components similar to those of the UE 104.

eNB 104 may include a communications module 132, a control module 136, and a mapping module 140 coupled with one another at least as shown. The communications module 132 may be further coupled with one or more antennas 144 of the eNB 104. The communications module 132 may communicate (e.g., transmit and/or receive) with one or more UEs (e.g., UEs 108, 112, and/or 116) over the network 100. In various embodiments, the eNB 104 may include at least as many antennas 144 as a number of simultaneous transmission streams transmitted to the UE 108, although the scope of the present disclosure may not be limited in this respect. One or more of the antennas 144 may be alternately used as transmit or receive antennas. Alternatively, or additionally, one or more of the antennas 144 may be dedicated receive antennas or dedicated transmit antennas.

In various embodiments, the antennas 144 may be associated with a plurality of antenna ports of the eNB 104. The antenna ports may apply different beamforming parameters to their respective transmissions to provide spatial diversity between the transmissions of different antenna ports. For example, the antenna ports may use different reference signals, such as UE-specific reference signals (UE-RS, also referred to as demodulation reference signals (DM-RS)) for transmission to the UE 108 and/or other UEs.

In various embodiments, the control module 136 may generate an enhanced physical downlink control channel (ePDCCH) for transmission to one or more UEs (e.g., the UE 108). The ePDCCH may include downlink control information (DCI) for the UE 108. The DCI may include, for example, information related to scheduling of downlink resources for a physical downlink shared channel (PDSCH), scheduling of uplink resources for a physical uplink shared channel (PUSCH), and/or transmit power control commands for the PUSCH and/or a physical uplink control channel (PUCCH).

In various embodiments, the mapping module 140 may assign the ePDCCH to one or more enhanced control channel elements (eCCEs) of a physical resource block (PRB) pair. The ePDCCH may be transmitted with an aggregation level that indicates how many eCCEs are used to transmit the ePDCCH. In some embodiments, the aggregation level may be 1, 2, 4, or 8.

The individual eCCEs may include a plurality of enhanced resource element groups (eREGs), and the eREGs may include a plurality of resource elements. Individual resource elements may correspond to a frequency and time resource within the PRB pair. In some embodiments, the eREGs may include a group of contiguous resource elements. By contiguous, it is meant that each resource element included in an individual eREG may be contiguous in time and/or frequency with at least one other resource element in the same eREG. In another embodiment, the eREGs may include a group of non-contiguous resource elements (e.g., individual eREGs may include at least one resource element that is not contiguous with another resource element of the eREG).

Figure 2:
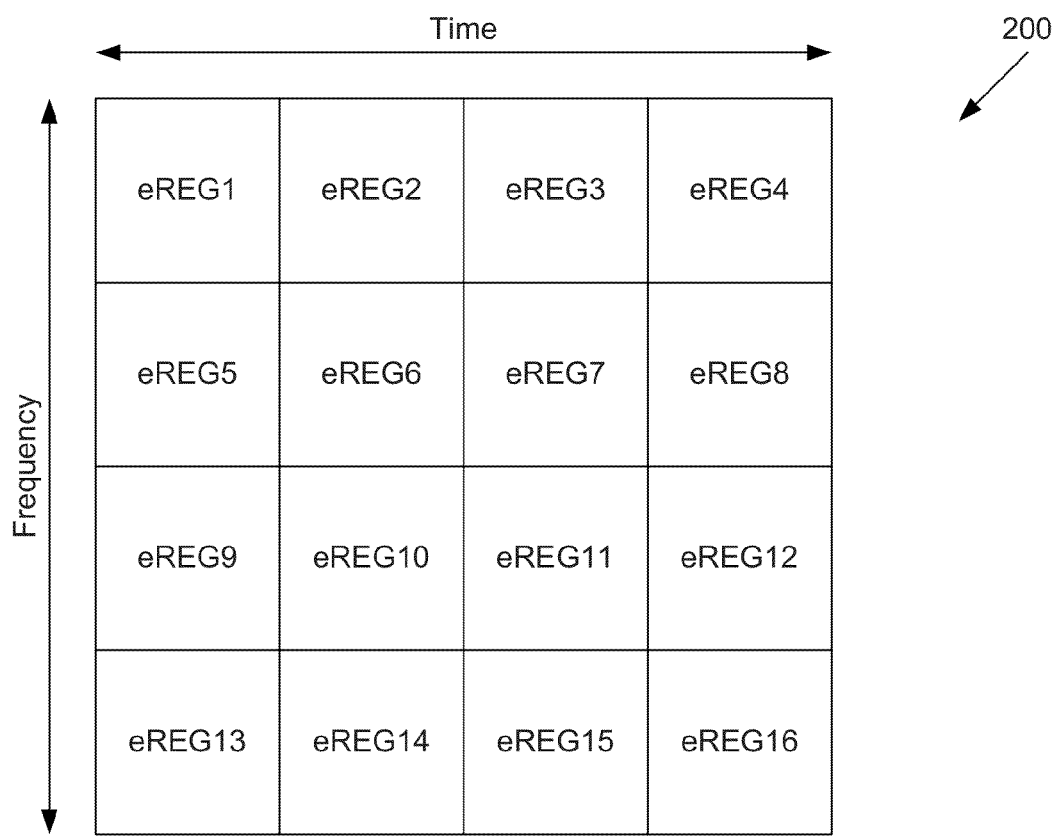
FIG. 2 is a block diagram of a physical resource block (PRB) pair in accordance with various embodiments.

Individual eREGs of the PRB pair may be associated with an index (e.g., 1, 2, ... n, where n is the number of eREGs in the PRB pair). For example, FIG. 2 illustrates a PRB pair 200 with sixteen eREGs having respective indexes from 1 to 16. The indexes may be ordered in successive time intervals within a row of a common frequency, followed by ordering the next row of eREGs having a successive frequency value, as shown in FIG. 2. Other embodiments may include alternative arrangements of the eREGs within the PRB pair.

In various embodiments, the mapping module 140 may map individual eCCEs of the PRB pair 200 to a plurality of non-continuous eREGs of the PRB pair 200 and/or across eREGs in different PRB pairs. That is, the eCCE may include a group of eREGs that have associated index numbers that are not consecutive (e.g., with at least one discontinuity among the indexes of the group of eREGs). The group of eREGs may be considered non-continuous if there is at least one discontinuity among the indexes of the individual eREGs of the group of eREGs. As an example, a group of eREGs consisting of eREG1, eREG2, eREG5, and eREG6 is considered non-continuous since it does not include eREG3 or eREG4. An eCCE having a non-continuous group of eREGs may be referred to as a distributed eCCE. In some embodiments, the eREGs of the distributed eCCE may also be non-contiguous, although this is not required.

Figure 3:
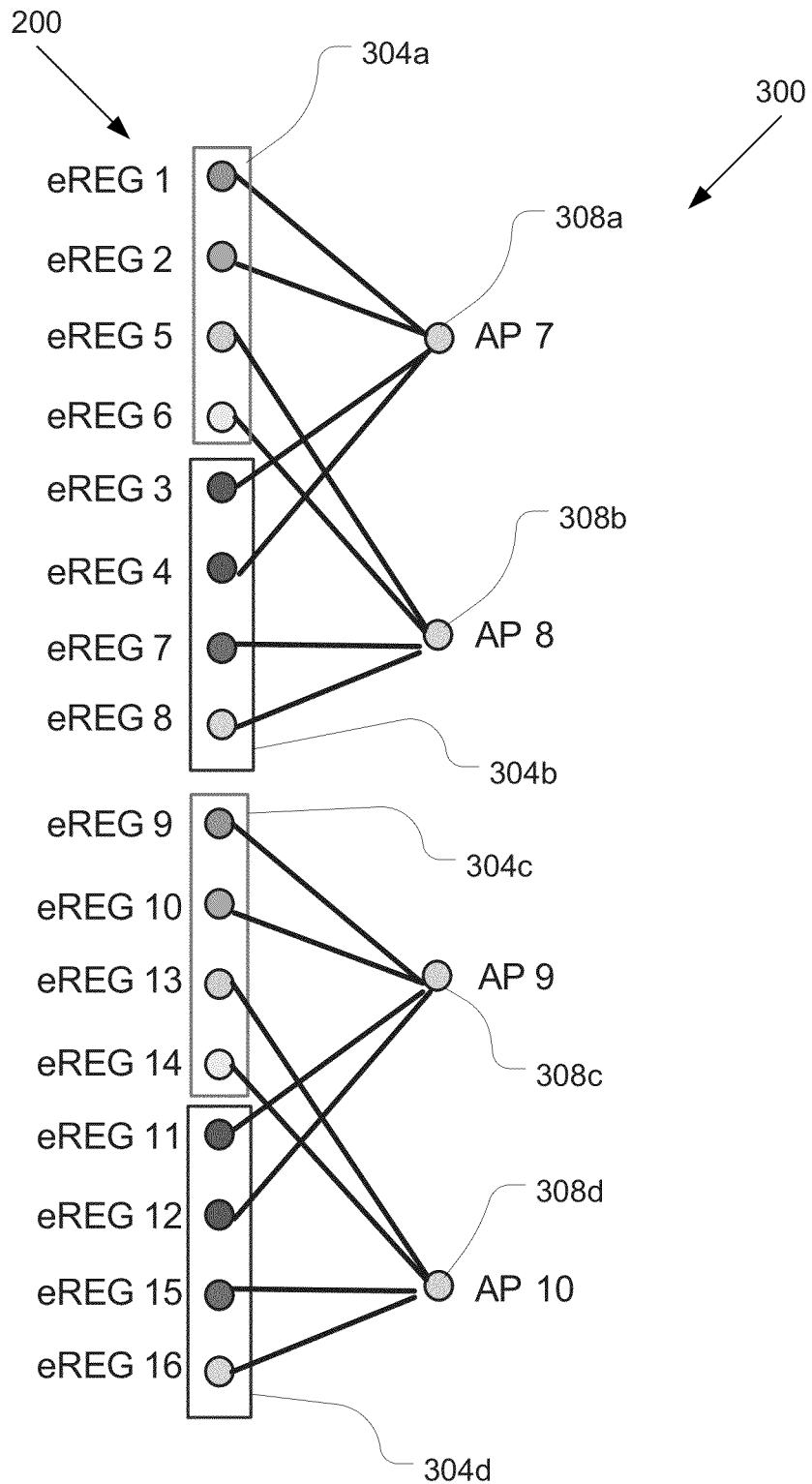
FIG. 3 is a diagram illustrating a mapping scheme for mapping enhanced resource element groups (eREGs) of a PRB pair to respective enhanced control channel elements (eCCEs) and antenna ports in accordance with various embodiments.

FIG. 3 illustrates a mapping scheme 300 that maps the eREGs of PRB pair 200 to four distributed eCCEs 304a-d (eCCE1 304a, eCCE2 304b, eCCE3 304c, and eCCE4 304d). Each eCCE 304a-d includes a group of four non-continuous eREGs as shown. For example, eCCE1 304a includes eREG1, eREG2, eREG5, and eREG6, while eCCE2 304b includes eREG3, eREG4, eREG7, and eREG8. In other embodiments, the distributed eCCEs 304a-b may include more or less eREGs.

The distributed eCCEs 304a-d may be contrasted with a localized eCCE which may include a group of continuous eREGs (e.g., eREG1, eREG2, eREG3, and eREG4). In various embodiments, the eNB 104 may switch between transmitting distributed eCCEs and transmitting localized eCCEs. For example, the eNB 104 may use localized eCCE transmission when the eNB 104 has sub-band channel state information (CSI), which may allow the eNB 104 to achieve frequency scheduling gain. The eNB 104 may use distributed eCCEs for transmission when the eNB 104 does not have sub-band CSI. The distributed eCCEs may provide frequency and spatial diversity to facilitate the eNB 104 to achieve a block error rate (BLER) target.

In various embodiments, the mapping module 140 may map the eREGs to individual antenna ports 308a-d of the eNB 104 for transmission. The antenna ports 308a-d may correspond to antenna ports 7, 8, 9, and 10, respectively. The antenna ports 308a-d may be associated with different UE-RSs to provide spatial diversity between their respective transmissions.

In various embodiments, the mapping module 140 may map the eREGs to respective antenna ports 308a-d so that individual antenna ports 308a-d are associated with a continuous group of eREGs. For example, eREGs 1 through 4 may be mapped to antenna port 308a, eREGs 5 through 8 may be mapped to antenna port 308b, eREGs 9-12 may be mapped to antenna port 308c, and eREGs 13-16 may be mapped to antenna port 308d. Thus, the eREG-to-antenna port mapping may be the same for the distributed eCCEs 304a-d as for localized eCCEs. Accordingly, the ePDCCH may present the same interference fingerprint whether the eNB 104 is utilizing localized or distributed transmission. This may facilitate a neighboring cell to successfully block the interference.

Since an individual eCCE may include a group of non-consecutive eREGs, the eCCE includes eREGs mapped to different antenna ports, thereby providing spatial diversity for the transmission of the eCCE. Accordingly, the mapping scheme 300 may provide spatial diversity for the distributed eCCE while also presenting the same interference fingerprint for distributed eCCEs and localized eCCEs.

In various embodiments, the mapping module 140 may map at least a portion of the ePDCCH to one or more of the eCCEs for transmission to the UE 108. In some embodiments, the ePDCCH may be distributed among eCCEs of a plurality of PRB pairs (e.g., PRB pairs of different frequencies). In other embodiments, the ePDCCH may be mapped entirely to the PRB pair 200. In some embodiments, the mapping module 140 may map one or more additional ePDCCHs (e.g., ePDCCHs for other UEs) to other eCCEs of the PRB pair 200.

Figure 4:
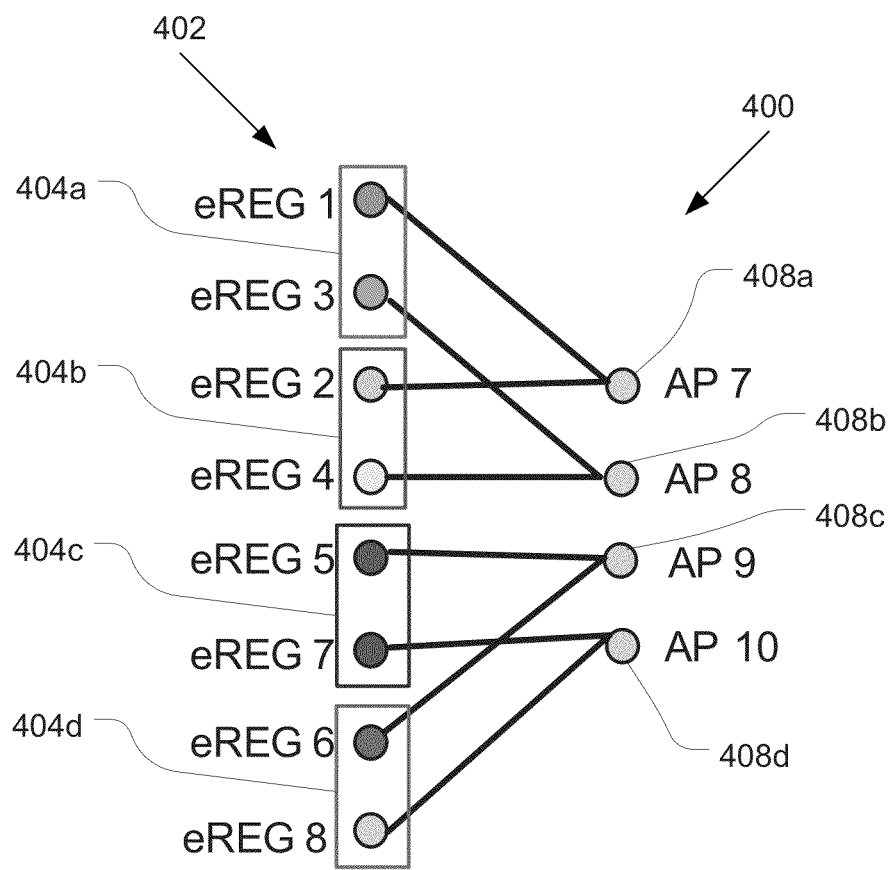
FIG. 4 is a diagram illustrating a mapping scheme for mapping eREGs of an alternative PRB pair to respective eCCEs and antenna ports in accordance with various embodiments.

FIG. 4 illustrates a mapping scheme 400 for an alternative PRB pair 402 including four eCCEs 404a-d each having two eREGs. The individual eCCEs 404a-d may include non-continuous eREGs (e.g., eREGs with non-consecutive indexes). For example, eCCE 404a may include eREG1 and eREG3, while eCCE 404b may include eREG2 and eREG4.

The eREGs may be mapped to antenna ports 408a-d in continuous groups. For example, eREG1 and eREG2 may be mapped to antenna port 408a, while eREG3 and eREG4 may be mapped to antenna port 408b. Accordingly, the eCCEs 404a-d may include eREGs that are mapped to different antenna ports, while the eREG-to-antenna port mapping scheme may present the same interference fingerprint as for localized eCCEs.

Figure 5:
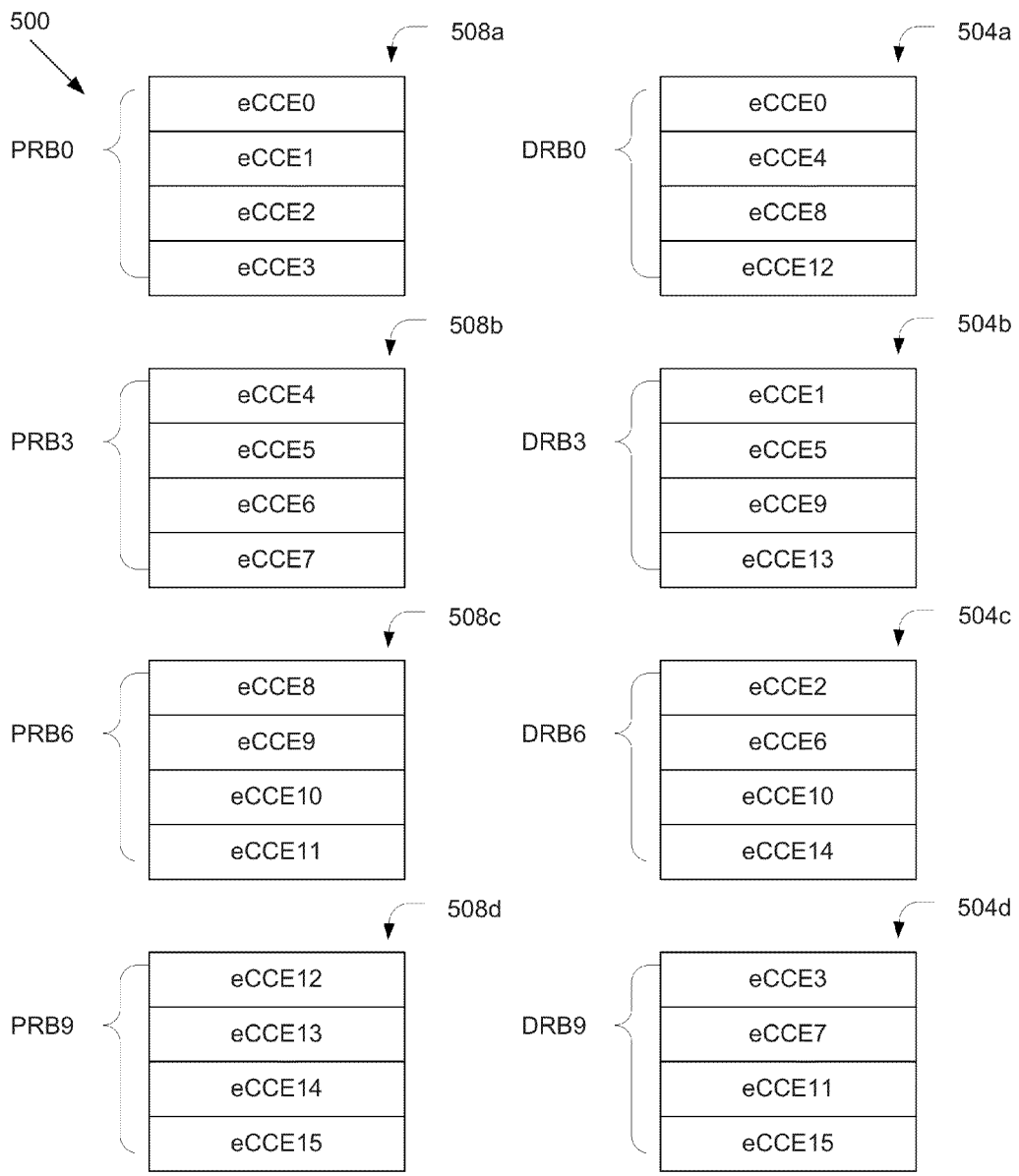
FIG. 5 is a diagram illustrating a mapping scheme for mapping eCCEs of a plurality of PRB pairs to a plurality of distributed resource block (DRB) pairs in accordance with various embodiments.

FIG. 5 illustrates a mapping scheme 500 for mapping a plurality of PRB pairs 508a-d to a plurality of distributed resource block (DRB) pairs 504a-d in accordance with various embodiments. The DRB pair mapping scheme 500 may be used in addition to, or independently from, the mapping schemes 300 and/or 400 described herein.

In various embodiments, the communications module 132 of the eNB 104 may communicate with the UE 108 using a plurality of PRB pairs 508a-d. The individual PRB pairs 508a-d may include a plurality (e.g., four) eCCEs as shown. The eCCEs may be localized or distributed. The mapping module 140 may map the eCCEs of an individual PRB pair to a plurality of DRB pairs. For example, the mapping module 140 may define four DRB pairs 504a-d, with individual DRB pairs 504a-d including an eCCE from each of four PRB pairs 508a-d, as shown in FIG. 5. Accordingly, DRB pair 504a may include one eCCE from each of the PRB pairs 508a-d (e.g., eCCE0, eCCE4, eCCE8, and eCCE12). Although FIG. 5 shows four PRB pairs 508a-d mapped to four DRB pairs 504a-d, other embodiments may include any number N of PRB pairs mapped to N DRB pairs.

In various embodiments, the mapping module 140 may assign the ePDCCH to one or more of the DRB pairs 504a-d for transmission. The ePDCCH may be assigned to the one or more DRB pairs in a localized manner (e.g., concentrated in as few DRB pairs as possible). For example, if the ePDCCH has an aggregation level of 1, 2, or 4, the entire ePDCCH may be assigned to one DRB pair (e.g., DRB pair 504a). If the ePDCCH has an aggregation level of 8, the ePDCCH may be assigned to two DRB pairs (e.g., DRB pairs 504a and 504b), and may use all eight eCCEs of the two DRB pairs.

In LTE Release 11, it is required that the PDSCH may not be transmitted in the same PRB pair as an ePDCCH. This requirement simplifies the implementation complexity for the UE 108. For example, the eNB 104 may transmit DCI to the UE 108 that indicates entire PRB pairs that include the PDSCH. The UE 108 may not need to do rate matching around the resource elements of the ePDCCH.

However, for a distributed ePDCCH, which may be assigned to eREGs of a plurality of PRB pairs, this requirement may cause bandwidth wastage, since remaining resources of a PRB pair which includes a portion of one ePDCCH may not be used to transmit the PDSCH. The DRB pair mapping scheme 500 provides the benefits of a distributed ePDCCH (since each DRB pair 504a-d includes eCCEs from a plurality of PRB pairs 508a-d), while freeing up the other DRB pairs 504a-d for use to transmit the PDSCH.

Thus, one or more of the DRB pairs 504a-d may be designated for control channel (e.g., ePDCCH) transmission, and one or more of the remaining DRB pairs 504a-d may be designated for PDSCH transmission. For example, the mapping module 140 may assign an ePDCCH to DRB pair 504a, and may designate DRB pairs 504b-d for transmission of the PDSCH.

In various embodiments, the PRB pairs 508a-d may be differentiated in the frequency domain. Additionally, or alternatively, the communications module 132 of the eNB 104 may apply different beamforming properties (e.g., different DM-RS) for transmitting the individual eCCEs of a given DRB pair. Accordingly, the eCCEs of the individual DRB pairs may have frequency diversity and/or spatial diversity.

In some embodiments, the mapping module 140 may assign a plurality of ePDCCHs to the DRB pairs 504a-d (e.g., ePDCCHs for multiple UEs). For example, the DRB pair 504a may be used to transmit two ePDCCHs of aggregation level 2, one ePDCCH of aggregation level 2 and one or two ePDCCHs of aggregation level 1, or up to four ePDCCHs of aggregation level 1.

In various embodiments, UE 108 (e.g., the resource management module 124) may receive a distributed ePDCCH allocated to one or more DRB pairs 504a-d as described herein, and may identify the ePDCCH as distributed rather than localized. The ePDCCH may include DCI that includes resource block identifiers to identify resources on which the PDSCH is transmitted. The UE 108 may interpret the resource block identifiers as referring to DRB pairs rather than PRB pairs based on the identification of the ePDCCH as distributed. On the other hand, if the UE 108 receives a localized ePDCCH (e.g., receives the ePDCCH in one or more PRBs), then the UE 108 may interpret the resource block identifiers as corresponding to PRB pairs rather than DRB pairs. The UE 108 may thereafter receive the PDSCH in another DRB pair based on the identification of the ePDCCH as distributed and the resource block identifiers included in the DCI.

For example, as shown in FIG. 5, PRB pairs 508a-d may correspond to PRB0, PRB3, PRB6, and PRB9, respectively, of a resource space. The DRB pairs 504a-d may correspond to DRB0, DRB3, DRB6, and DRB9, respectively. If the UE 108 receives a distributed ePDCCH in DRB0 504a with DCI indicating that resource blocks 3, 6, and 9 are assigned to the UE 108 for PDSCH transmission, the UE 108 may interpret the DCI as indicating that the PDSCH will be transmitted on DRB3 504b, DRB6 504c, and DRB9 504d. However, if the UE 108 receives a localized ePDCCH in PRB 508a with DCI indicating that resource blocks 3, 6, and 9 are assigned to the UE 108 for PDSCH transmission, the UE 108 may interpret the DCI as indicating that the PDSCH will be transmitted on PRB3 508b, PRB6 508c, and PRB9 508d. Accordingly, the mapping scheme 500 may not require additional signaling to notify the UE 108 that the resource block identifiers refer to DRB pairs 504a-d rather than PRB pairs 508a-d.

In some embodiments, the DRB pairs 504a-d may be used only for rank 1 transmissions for a single UE (e.g., UE 108). This may be due to limitations of the UE-RS. However, the UE 108 may still receive higher rank transmissions (e.g., multiple input multiple output (MIMO) transmissions and/or multi-user MIMO (MU-MIMO) transmissions) on one or more PRB pairs. For example, the UE may know that PRB0, PRB3, PRB6, and PRB9 are mapped to DRBs as shown in FIG. 5. One or more other PRBs of the resource space (e.g., PRB1, PRB2, etc.) may not be mapped to DRBs. If the UE receives DCI allocating DRBs together with other PRBs for PDSCH transmission, the UE may regard the DRBs as the first layer regardless of the UE-RS port associated with the DRBs.

As an example, the UE may receive DCI (e.g., DCI format 2C) in DRB0 504a indicating that the UE is allocated to receive the PDSCH on PRBs 1, 2, 3, 6, and 9 with rank 2 transmission using UE-RS ports 7 and 8. In this case, the UE may interpret PRBs 3, 6, and 9 as referring to DRB3 504b, DRB6 504c, and DRB9 504d, respectively. The first PDSCH layer may be transmitted on PRB1 and PRB2 on UE-RS port 7, and DRB3, DRB6, and DRB9 on the eCCE-specific antenna port. The second PDSCH layer may be transmitted on PRB1 and PRB2 only, using UE-RS port 8. The second PDSCH layer may not be transmitted on the DRBs.

Figure 6:
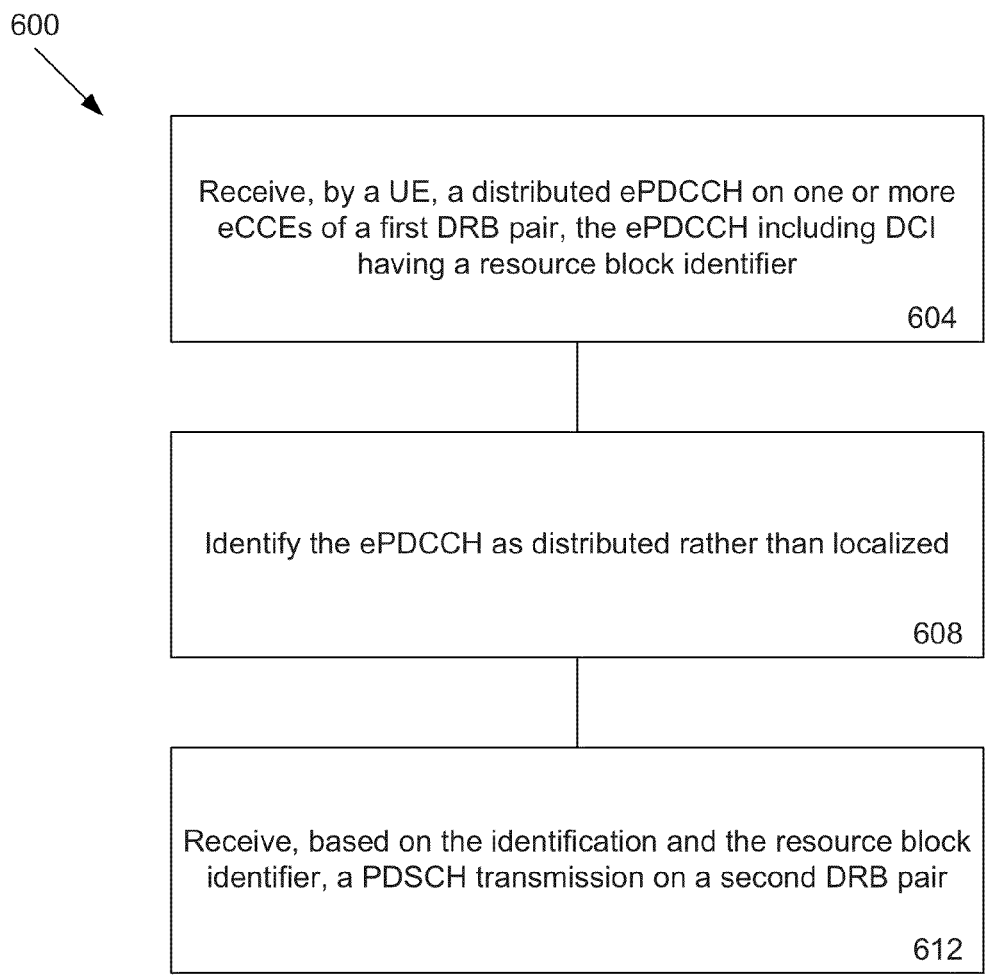
FIG. 6 is a flowchart illustrating a method of receiving an enhanced physical downlink control channel (ePDCCH) and a physical downlink shared channel (PDSCH) that may be performed by a user equipment in accordance with various embodiments.

FIG. 6 illustrates a method 600 that may be performed by a UE (e.g., UE 108) in accordance with various embodiments. In some embodiments, the UE may include and/or have access to one or more computer-readable media having instructions stored thereon, that, when executed, cause the UE to perform the method 600.

At 604, the UE may receive a distributed ePDCCH from an eNB (e.g., eNB 104). The distributed ePDCCH may include DCI allocated to one or more eCCEs of a first DRB pair (e.g., DRB pair 504a). The first DRB pair may include eCCEs mapped from a plurality of PRB pairs, as described herein. The DCI may include a resource block identifier indicating a resource assigned to the UE for receiving the PDSCH.

At 608, the UE may identify the ePDCCH as distributed rather than localized.

At 612, the UE may receive, based on the identification of the ePDCCH as distributed and the resource block identifier included in the DCI, a PDSCH transmission in a second DRB. The UE may interpret the resource block identifier as corresponding to the second DRB based on the identification of the ePDCCH as distributed.

Figure 7:
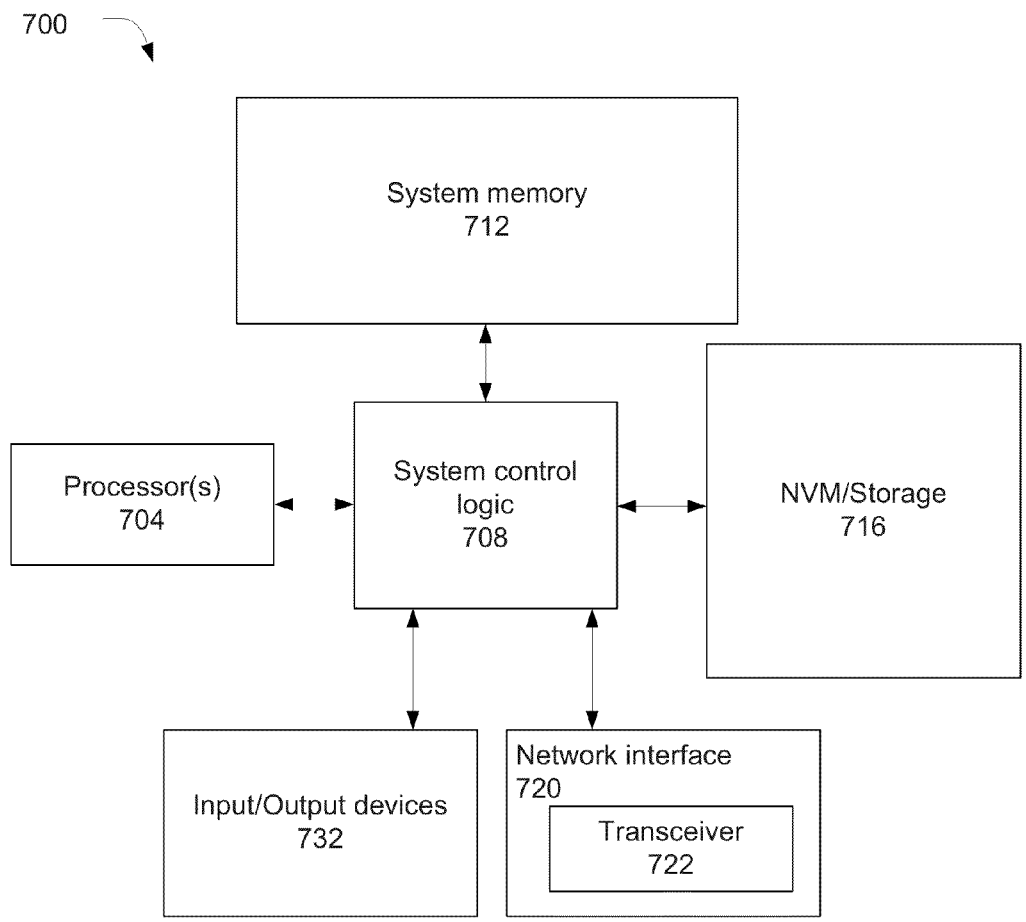
FIG. 7 is a block diagram illustrating an example computing system in accordance with various embodiments.

The eNB 104 and/or UE 108 described herein may be implemented into a system using any suitable hardware and/or software to configure as desired. FIG. 7 illustrates, for one embodiment, an example system 700 comprising one or more processor(s) 704, system control logic 708 coupled with at least one of the processor(s) 704, system memory 712 coupled with system control logic 708, non-volatile memory (NVM)/storage 716 coupled with system control logic 708, a network interface 720 coupled with system control logic 708, and input/output (I/O) devices 732 coupled with system control logic 708.

The processor(s) 704 may include one or more single-core or multi-core processors. The processor(s) 704 may include any combination of general-purpose processors and dedicated processors (e.g., graphics processors, application processors, baseband processors, etc.).

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, for example, for system 700. System memory 712 for one embodiment may include any suitable volatile memory, such as suitable dynamic random access memory (DRAM), for example.

NVM/storage 716 may include one or more tangible, non-transitory computer-readable media used to store data and/or instructions, for example. NVM/storage 716 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 716 may include a storage resource physically part of a device on which the system 700 is installed or it may be accessible by, but not necessarily a part of, the device. For example, the NVM/storage 716 may be accessed over a network via the network interface 720 and/or over Input/Output (I/O) devices 732.

Network interface 720 may have a transceiver 722 to provide a radio interface for system 700 to communicate over one or more network(s) and/or with any other suitable device. The transceiver 722 may implement communications module 120 of UE 108 or communications module 132 of eNB 104. In various embodiments, the transceiver 722 may be integrated with other components of system 700. For example, the transceiver 722 may include a processor of the processor(s) 704, memory of the system memory 712, and NVM/Storage of NVM/Storage 716. Network interface 720 may include any suitable hardware and/or firmware. Network interface 720 may include a plurality of antennas to provide a multiple input, multiple output radio interface. Network interface 720 for one embodiment may include, for example, a wired network adapter, a wireless network adapter, a telephone modem, and/or a wireless modem.

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

In various embodiments, the I/O devices 732 may include user interfaces designed to enable user interaction with the system 700, peripheral component interfaces designed to enable peripheral component interaction with the system 700, and/or sensors designed to determine environmental conditions and/or location information related to the system 700.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 720 to communicate with components of a positioning network, e.g., a global positioning system (GPS) satellite.

In various embodiments, the system 700 may be a mobile computing device such as, but not limited to, a laptop computing device, a tablet computing device, a netbook, a smartphone, etc. In various embodiments, system 700 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
    a communications module configured to communicate with a user equipment (UE) over a wireless communication network via a plurality of antenna ports;
    a control module configured to generate an enhanced physical downlink control channel (ePDCCH); and
    a mapping module coupled with the control module and the communications module and configured to:
        map individual enhanced control channel elements (eCCEs) of a physical resource block (PRB) pair including a plurality of eCCEs to a plurality of non-continuous enhanced resource element groups (eREGs) of the PRB pair;
        map the plurality of eREGs to individual antenna ports for transmission to the UE, wherein individual antenna ports are associated with a continuous group of eREGs; and
        assign at least a portion of the ePDCCH to one or more of the eCCEs for transmission to the UE.

2. The apparatus of claim 1, wherein the control module is configured to distribute the ePDCCH over eCCEs of a plurality of PRB pairs of different frequencies.

3. The apparatus of claim 1, wherein the ePDCCH includes downlink control information (DCI) for the UE.

4. The apparatus of claim 1, wherein the PRB pair includes four eCCEs.

5. The apparatus of claim 4, wherein individual eCCEs include four eREGs.

6. The apparatus of claim 5, wherein the PRB pair includes eREGs 1 through 16 in continuous order, and wherein a first eCCE of the four eCCEs includes eREG 1, eREG 2, eREG 5, and eREG 6.

7. The apparatus of claim 6, wherein the plurality of antenna ports include first, second, third, and fourth antenna ports, wherein the ePDCCH is a distributed ePDCCH, and wherein a mapping relationship of the eREGs to the antenna ports is the same for the ePDCCH as for a localized ePDCCH.

8. The apparatus of claim 7, wherein the plurality of antenna ports include first, second, third, and fourth antenna ports, and wherein:
    eREGs 1 through 4 are mapped to the first antenna port;
    eREGs 5 through 8 are mapped to the second antenna port;
    eREGs 9 through 12 are mapped to the third antenna port; and
    eREGs 13 through 16 are mapped to the fourth antenna port.

9. The apparatus of claim 4, wherein individual eCCEs include two eRGEs.

10. The apparatus of claim 9, wherein the PRB pair includes eREGs 1 through 8 in continuous order, and wherein a first eCCE of the four eCCEs includes eREG 1 and eREG 3.

11. The apparatus of claim 1, wherein the antenna ports are associated with different demodulation reference signals (DM-RS).

12. An apparatus comprising:
    a communications module configured to communicate with user equipments (UEs) over a wireless communication network using a plurality of physical resource block (PRB) pairs, individual PRB pairs including a plurality of enhanced control channel elements (eCCEs);
    a control module configured to provide an enhanced physical downlink control channel (ePDCCH); and
    a mapping module configured to:
        map the eCCEs to a plurality distributed resource block (DRB) pairs to distribute the eCCEs of individual PRB pairs among the plurality of DRB pairs; and
        assign the ePDCCH to a first DRB pair of the plurality of DRB pairs for transmission to one or more of the UEs.

13. The apparatus of claim 12, wherein the PRB pairs are differentiated in the frequency domain.

14. The apparatus of claim 12, wherein the candidate ePDCCH has an aggregation level of 1, 2, or 4, and the entire ePDCCH is assigned to the first DRB pair.

15. The apparatus of claim 12, wherein the candidate ePDCCH has an aggregation level of 8, and the ePDCCH is assigned to two DRB pairs including the first DRB pair.

16. The apparatus of claim 12, wherein the first DRB pair is designated for ePDCCH transmission.

17. The apparatus of claim 16, wherein the eCCEs of a second DRB pair of the plurality of DRB pairs is designated for transmission of a physical downlink shared channel (PDSCH).

18. The apparatus of claim 12, wherein the eCCEs are localized eCCEs.

19. The apparatus of claim 12, wherein four PRB pairs are mapped to four DRB pairs, each DRB pair including an eCCE from each of the PRB pairs.

20. The apparatus of claim 12, wherein the ePDCCH is a first ePDCCH, and wherein the mapping module is further configured to map a second ePDCCH to the first DRB pair.

21. The apparatus of claim 12, wherein the communications module is configured to use different beamforming properties for transmitting the individual eCCEs of the first DRB.

22. The apparatus of claim 12, wherein the ePDCCH includes downlink control information (DCI) to notify the UE of the DRBs used to transmit a physical downlink shared channel (PDSCH).

23. One or more non-transitory computer readable media having instructions, stored thereon, that, when executed, cause a computing system to:
- receive a distributed enhanced physical downlink control channel (ePDCCH) from an e Node B (eNB), the distributed ePDCCH including downlink control information (DCI) allocated to one or more enhanced control channel elements (eCCEs) of a first distributed resource block (DRB) pair, wherein the first DRB pair includes eCCEs mapped from a plurality of physical resource block (PRB) pairs;
- identify the ePDCCH as distributed rather than localized; and
- receive, based on the identification and resource block identifiers included in the DCI, a physical downlink shared channel (PDSCH) transmission in a second DRB pair.

24. The one or more computer readable media of claim 23, wherein the first DRB pair is designated for ePDCCH transmission and the second DRB pair is designated for PDSCH transmission.

25. The one or more computer readable media of claim 23, wherein the PRB pairs are differentiated in the frequency domain.

26. The one or more computer readable media of claim 23, wherein four PRB pairs are mapped to four DRB pairs, the eCCEs of individual PRB pairs distributed evenly over the DRB pairs.

27. The one or more computer readable media of claim 23, wherein the ePDCCH has an aggregation level of 1, 2, or 4, and wherein the ePDCCH is entirely contained within the first DRB pair.

28. The one or more computer readable media of claim 23, wherein the PDCCH has an aggregation level of 8, and wherein the PDCCH is contained within two DRB pairs.

29. The one or more computer readable media of claim 23, wherein the first and second DRB pairs include eCCEs associated with the same PRB pairs.

* * * * *